(12) United States Patent
Cao et al.

(10) Patent No.: US 11,934,400 B2
(45) Date of Patent: Mar. 19, 2024

(54) OPTIMIZATION VIA DYNAMICALLY CONFIGURABLE OBJECTIVE FUNCTION

(71) Applicant: SAP SE, Walldorf (DE)

(72) Inventors: Xin Cao, Walldorf (DE); Jun Deng, Walldorf (DE)

(73) Assignee: SAP SE, Walldorf (DE)

( * ) Notice: Subject to any disclaimer, the term of this patent is extended or adjusted under 35 U.S.C. 154(b) by 38 days.

(21) Appl. No.: 17/341,822

(22) Filed: Jun. 8, 2021

(65) Prior Publication Data
US 2022/0391393 A1 Dec. 8, 2022

(51) Int. Cl.
G06F 16/2453 (2019.01)
G06F 3/04847 (2022.01)
G06F 16/22 (2019.01)
G06F 16/2455 (2019.01)
G06F 16/26 (2019.01)

(52) U.S. Cl.
CPC .... G06F 16/24549 (2019.01); G06F 3/04847 (2013.01); G06F 16/2237 (2019.01); G06F 16/24565 (2019.01); G06F 16/26 (2019.01)

(58) Field of Classification Search
CPC .......... G06F 16/24549; G06F 16/2237; G06F 16/26; G06F 16/24565; G06F 3/04847
USPC .......................................... 707/715; 715/863
See application file for complete search history.

(56) References Cited

U.S. PATENT DOCUMENTS

| | | | | |
|---|---|---|---|---|
| 6,236,985 | B1* | 5/2001 | Aggarwal | G06F 16/2237 705/37 |
| 2008/0092086 | A1* | 4/2008 | Hamadi | G06F 3/04847 715/863 |
| 2010/0100538 | A1* | 4/2010 | Koudas | G06F 16/24545 707/715 |
| 2016/0142248 | A1* | 5/2016 | Thubert | H04L 45/34 370/392 |
| 2018/0181559 | A1* | 6/2018 | Matskevich | G06F 40/35 |
| 2018/0365628 | A1* | 12/2018 | Bhaskaran | G06Q 10/063112 |
| 2019/0339661 | A1* | 11/2019 | Pancholi | G06Q 10/04 |
| 2021/0374143 | A1* | 12/2021 | Neill | G06F 16/24568 |
| 2022/0164346 | A1* | 5/2022 | Mitra | G06N 7/01 |

* cited by examiner

*Primary Examiner* — Giovanna B Colan
(74) *Attorney, Agent, or Firm* — Buckley, Maschoff & Talwalkar LLC

(57) ABSTRACT

Provided is a system and method for dynamic configuration of a multi-objective optimization function and identifying an optimal set of records based thereon. In one example, the method may include receiving a set of data records and priority values to be applied to the set of data records, generating an objective function from an objective function template stored in a memory device, wherein the generating comprises dynamically configuring parameter values of the objective function based on the priority values, executing the objective function on the set of data records and identifying an optimal subset of data records from among the set of data records based on the dynamically configured parameter values of the executing objective function, and displaying identifiers of the identified optimal subset of data records.

21 Claims, 7 Drawing Sheets

OPTIMIZATION VIA DYNAMICALLY CONFIGURABLE OBJECTIVE FUNCTION

BACKGROUND

An objective function may be used by a software program to select a best element (e.g., a maximum element, a minimum element, etc.) from among a set of available elements based on some selection criterion. Typically, the objective function is statically defined based on a selection criteria. Here, the selection criteria is based on the interests of a particular organization developing the objective function. When in use, a computer program may execute the objective function on data to obtain an optimal set of the data. However, over time, the priorities of an organization may change. As a result, the objective function may not accurately represent the organization's current interests. In this situation, a new objective function must be constructed. Furthermore, when an objective function is tailored for use by a particular organization, the objective function may not be beneficial for another organization unless both organizations have the exact same interests.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1A:
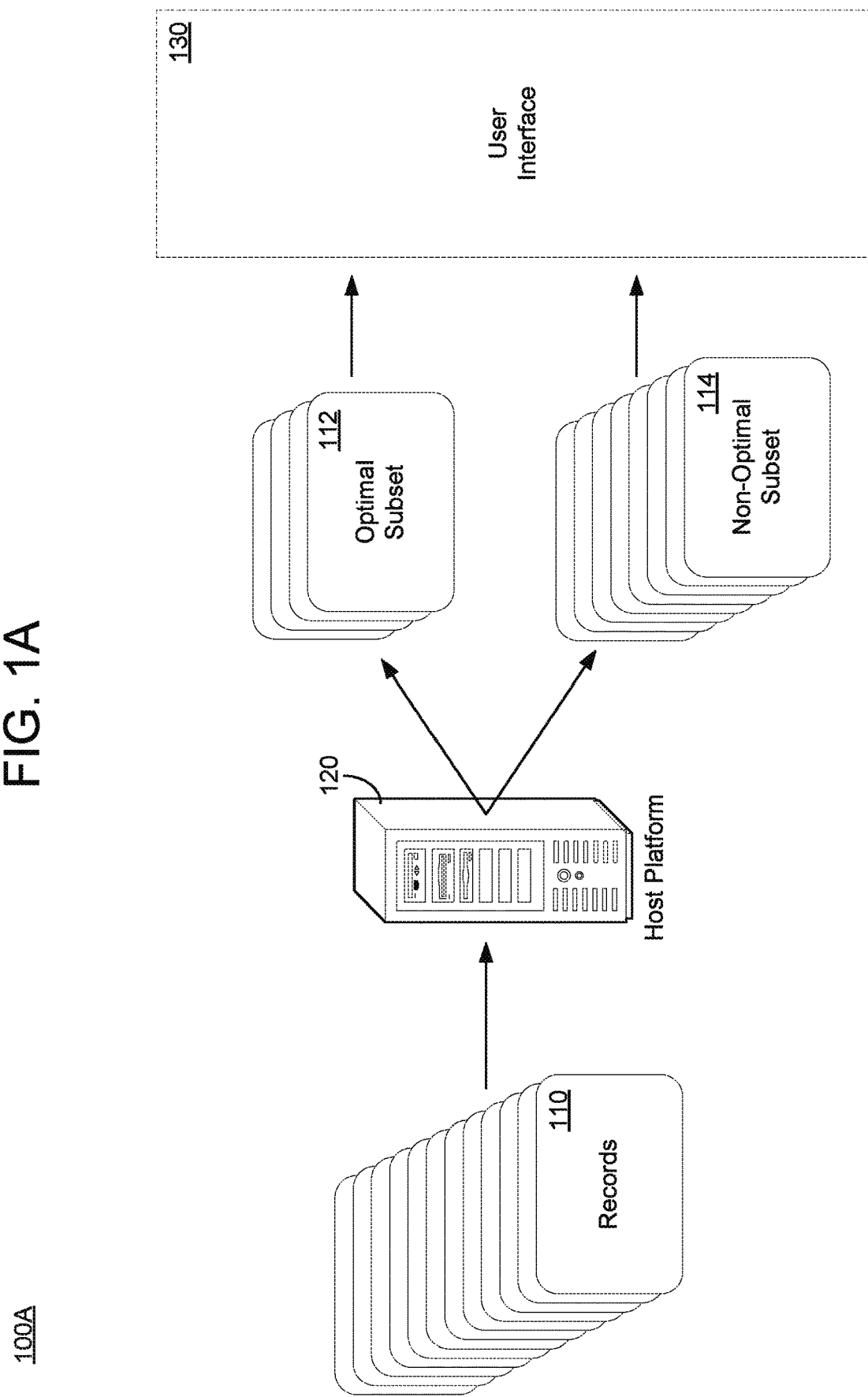
FIG. 1A is a diagram illustrating a process of selecting an optimal subset of records from among a set of records in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

The example embodiments are directed to a multi-objective optimization service (i.e., computer program) that may be dynamically configured to identify an optimal element or subset of elements among a larger group of elements. In one example, the multi-objective optimization service may process a set of data records to identify an optimal data record or subset of data records from among the larger set of data records. The service may have embedded therein an objective function template with parameter values that can be dynamically configured (e.g., at runtime, etc.). The objective function template may include empty fields or default values for parameter values which can be filled-in or otherwise replaced based on priority values that are dynamically input. In some embodiments, the priority values may be obtained from fields (storing user inputs) of a user interface and used to configure the parameter values of the objective function template.

Thus, the parameter values (e.g., coefficient weights applied to variables, etc.) of the objective function are dynamically configured at runtime by inputting values from the user interface into the objective function template and executing the filled-in objective function template. In addition, constraints of the objective function (used to impose limitations on the optimization) may be dynamically set or otherwise set via the user interface. By allowing dynamic configuration of the objective function, the multi-objective optimization service becomes a flexible optimization process that can adapt to the priorities of different organizations. Furthermore, each organization can dynamically configure the objective function differently based on their own specific interests.

In the examples herein, the multi-objective optimization service may be used to identify an optimal invoice or subset of invoices to pay by a particular payment method such as bill of exchange (BoE). In this case, a set of electronic invoices may be analyzed to identify invoices that should be paid using BoE as a payment method and invoices that should be paid with other payment methods (e.g., cash, check, etc.) based on dynamically configurable parameter values and constraints of an objective function that are tailored to the problem. For example, the parameter values may correspond to attributes of an invoice such as an amount due, due date, drawer bank, endorse time, or the like. In this case, the coefficient value (e.g., weight) that is applied to each of these attributes of the invoice may be dynamically configured when finding the optimal subset of invoices. While the examples herein are directed to identifying payment methods for invoices, it should also be understood that the multi-objective optimization service including the dynamically configurable objective function may be applied to other optimization problems in other areas such as machine learning, financial analysis, or the like.

FIG. 1A illustrates a process 100A of selecting an optimal subset of records 112 from among a set of records 110 in accordance with an example embodiment. Referring to FIG. 1A, a host platform 120 may host a multi-objective optimization service as described herein. The service may be used to identify and display the optimal subset of records 112 and a non-optimal subset of records 114 from among the larger set of records 110 based on execution of an objective function. For example, the host platform 120 may display a name of the record, an item number, a date, an amount, or the like, of each of the optimal set of records of a subset of optimal records. The parameter values of the variables within the objective function may be dynamically configured with values (weights) based on user inputs via a user interface 130. In this example, the host platform 120 may be a web server, a cloud platform, a database, a computing node, a blockchain node, or the like. The records 110 may include database entries, documents, invoices, files, tables, transactions, payment requisitions, and the like.

The host platform 120 may also output information about the optimal subset of records 112 and the non-optimal subset of records 114 via the user interface 130. Here, the user interface 130 may be part of a larger software application that includes the multi-objective optimization service and that is hosted by the host platform 120. The output information may include identifiers (e.g., document ID, invoice ID, etc.) of the data records within the optimal subset of records 112 and the data records within the non-optimal subset of records 114.

Figure 1B:
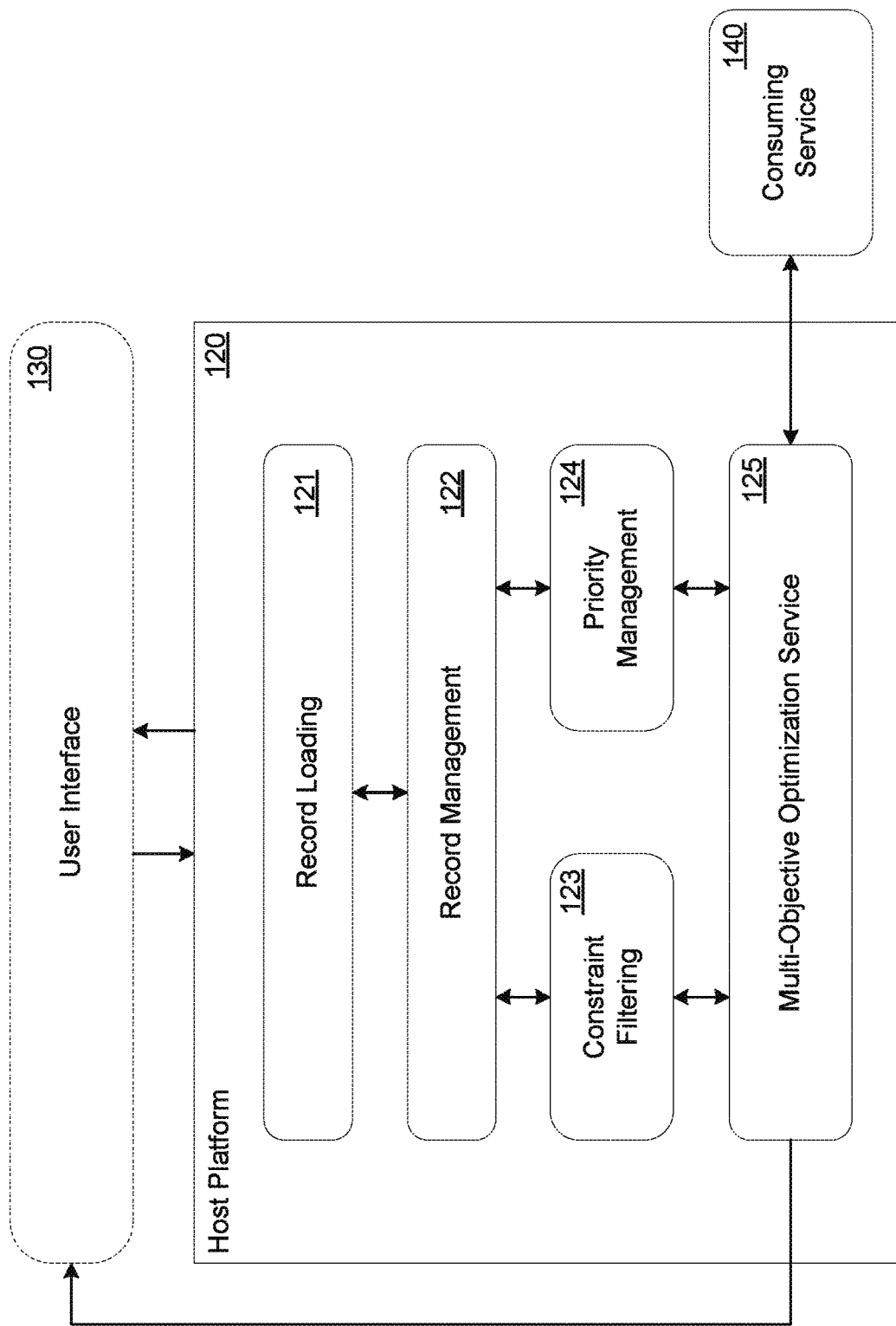
FIG. 1B is a diagram illustrating an architecture of a host service for selecting the optimal subset of records in accordance with an example embodiment.

FIG. 1B illustrates an architecture 100B of the host platform 120 for selecting the optimal subset of records in accordance with an example embodiment. Referring to FIG. 1B, the host platform 120 may include a plurality components running therein for optimal record identification. In some embodiments, the components are implemented via services that are part of a larger application hosted by the host platform 120. In this example, the host platform 120 may include a record loading module 121, a record management module 122, a constraint filtering module 123, a priority management module 124, and a multi-objective optimization service 125.

The record loading module 121 may be used to load/import records and other data from various external sources such as data repositories, databases, servers, and the like. The record management module 122 may be configured to manage the records that are loaded by the system. The constraint filtering module 123 may receive constraints that are input via the user interface 130 and filter the data records based on the constraints to remove data records from consideration that do not satisfy the constraints. In some embodiments, the constraints may be input ahead of time or they may be supplied at runtime.

The priority management module 124 may be configured to receive values via a user interface and configure parameter values (e.g., coefficient values, weights, etc.) that are to be applied to the variables when executing the objective function based on the received values. Thus, the parameters of the objective function can be dynamically configured at runtime. Furthermore, the multi-objective optimization service 125 may execute the dynamically configured objective function on the filtered data records to identify the optimal subset of records 112 and the non-optimal subset of records 114, and output information about the optimal subsets of records 112 and the non-optimal subset of records 114 to one or more of a consuming service 140 and the user interface 130.

Figure 2A:
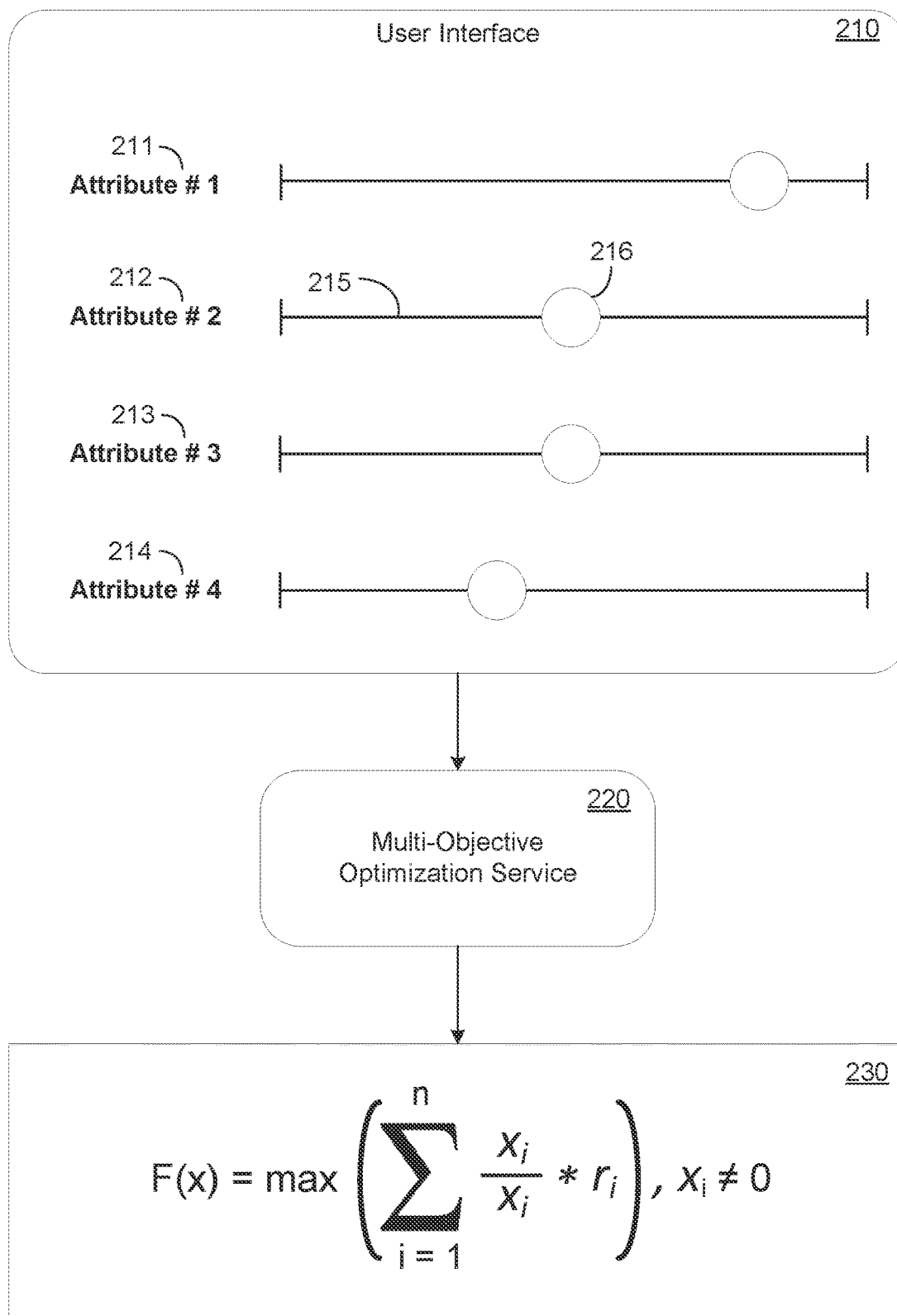
FIG. 2A is a diagram illustrating a process of dynamically configuring parameter values of an objective function in accordance with an example embodiment.

FIG. 2A illustrates a process 200A of dynamically configuring parameter values of an objective function template 230 in accordance with an example embodiment. Referring to FIG. 2A, a user interface 210 may be displayed via a user device such as a computer, a mobile device, a tablet, a laptop, a desktop, and the like. The user interface 210 may be part of a software application that is hosted by a host platform. Here, the user device may connect to the host platform via a network such as the Internet. The user interface 210 may include a plurality of attributes 211-214 that can be used to find an optimal element or subset of elements within a larger group. Each of the attributes 211-214 may be identified by name or some other identifier on the user interface 210. In addition, each of the attributes 211-214 may include an axis 215 and a slider 216 which moves along the axis 215 and which can be used to easily set a desired value for the respective attributes.

In this case, the attribute 211 is given more priority (i.e., more weight) over the attributes 212, 213, and 214. Likewise, the attribute 214 is given less priority than the remaining attributes 212 and 213. As another option, the user interface 210 may include fields which can receive text input to configure the priority of the different attributes 211-214. Thus, a user can interact with the user interface 210 to dynamically set the priority values for each of the different attributes 211-214 via input means such as a slider 216 or other input means.

The priority values (e.g., the position of the slider 216 on the axis 215) can be read by a multi-objective optimization service 220 from the user interface and used by the multi-objective optimization service to dynamically configure parameter values of an objective function template 230. For example, the multi-objective optimization service 220 may query the user interface 210 (e.g., via an application programming interface of the user interface 210, or the like) to obtain the priority values. In this example, each of the priority values may be used to configure parameters values (e.g., coefficients, weights, etc.) of each of the data records when processed by the objective function. Here, the multi-objective optimization service 220 may store the objective function template 230 which is dynamically filled-in or otherwise modified to include parameter values that are based/match the priority values of the attributes 211-214 in the user interface 210.

Figure 2B:
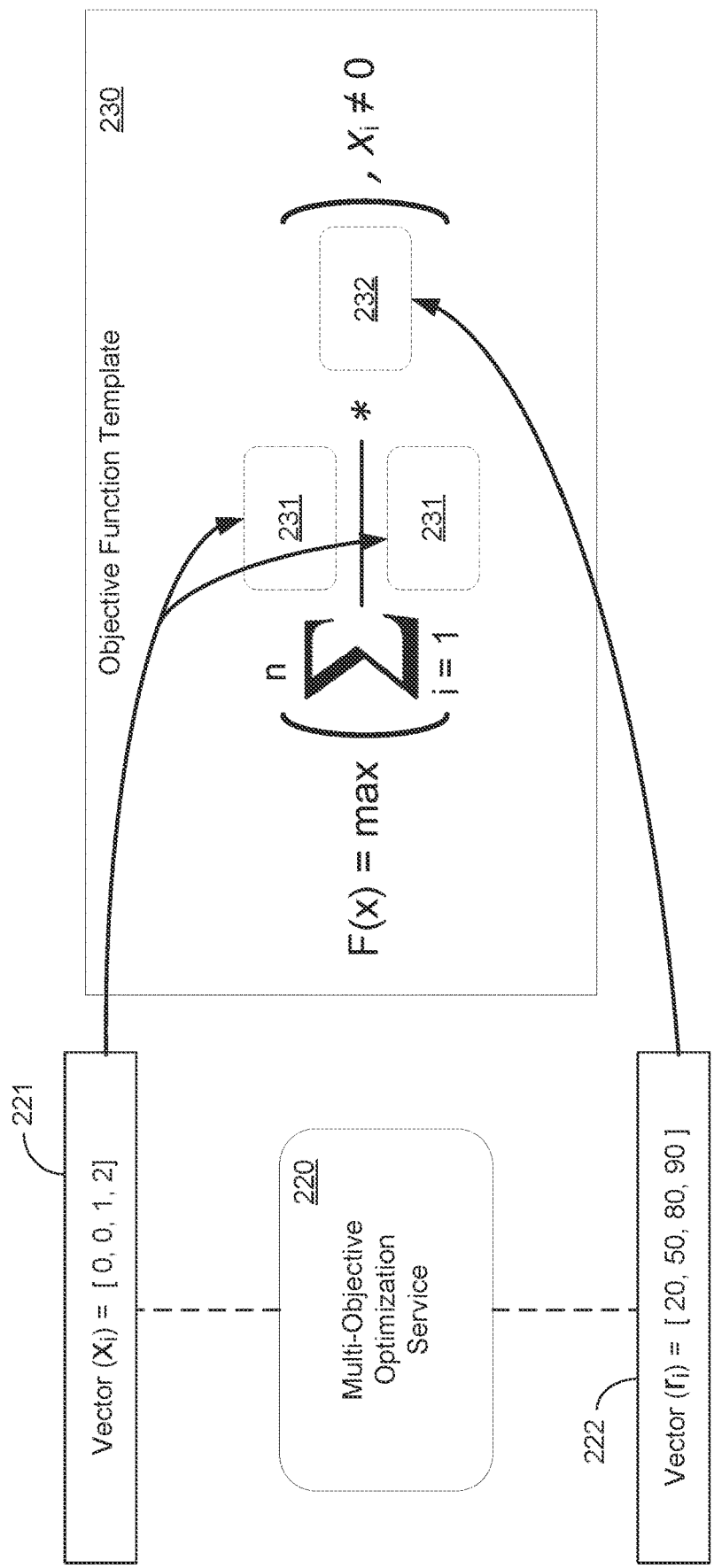
FIG. 2B is a diagram illustrating a process of inputting parameter values into an objective function template in accordance with an example embodiment.

FIG. 2B illustrates a process 200B of inputting parameter values into fields of the objective function template 230 in accordance with an example embodiment. Referring to FIG. 2B, each of the data records that are to be processed by the objective function may be represented in a first vector 221 where each value of the first vector 221 represents whether the data records is optimal or non-optimal. For example, the multi-objective optimization service may create a value for each record to be processed where the value is a 1 or a 0 based on whether the record is optimal or non-optimal, respectively.

The multi-objective optimization service 220 may also create a second vector 222 that identifies the priority values of the data records that are represented by the first vector 221. Here, the number of elements in the second vector 222 is equal to the number of elements in the first vector 221 because each data record element in the first vector 221 has a corresponding priority value/weight in the second vector 222. The second vector 222 may be used to dynamically configure the parameter values of the objective function template 230. Here, the objective function template 230 may include blank spaces or default values that are to be filled in with the input vectors. In this example, the multi-objective optimization service inputs the first vector 221 into the fields 231 of the objective function template 230 and inputs the second vector 222 into the field 232 of the objective function template 230. When the objective function template 230 is filled-in, the multi-objective optimization service 220 can execute the filled-in objective function on the set of data records to identify an optimal subset of data records.

Figure 3:
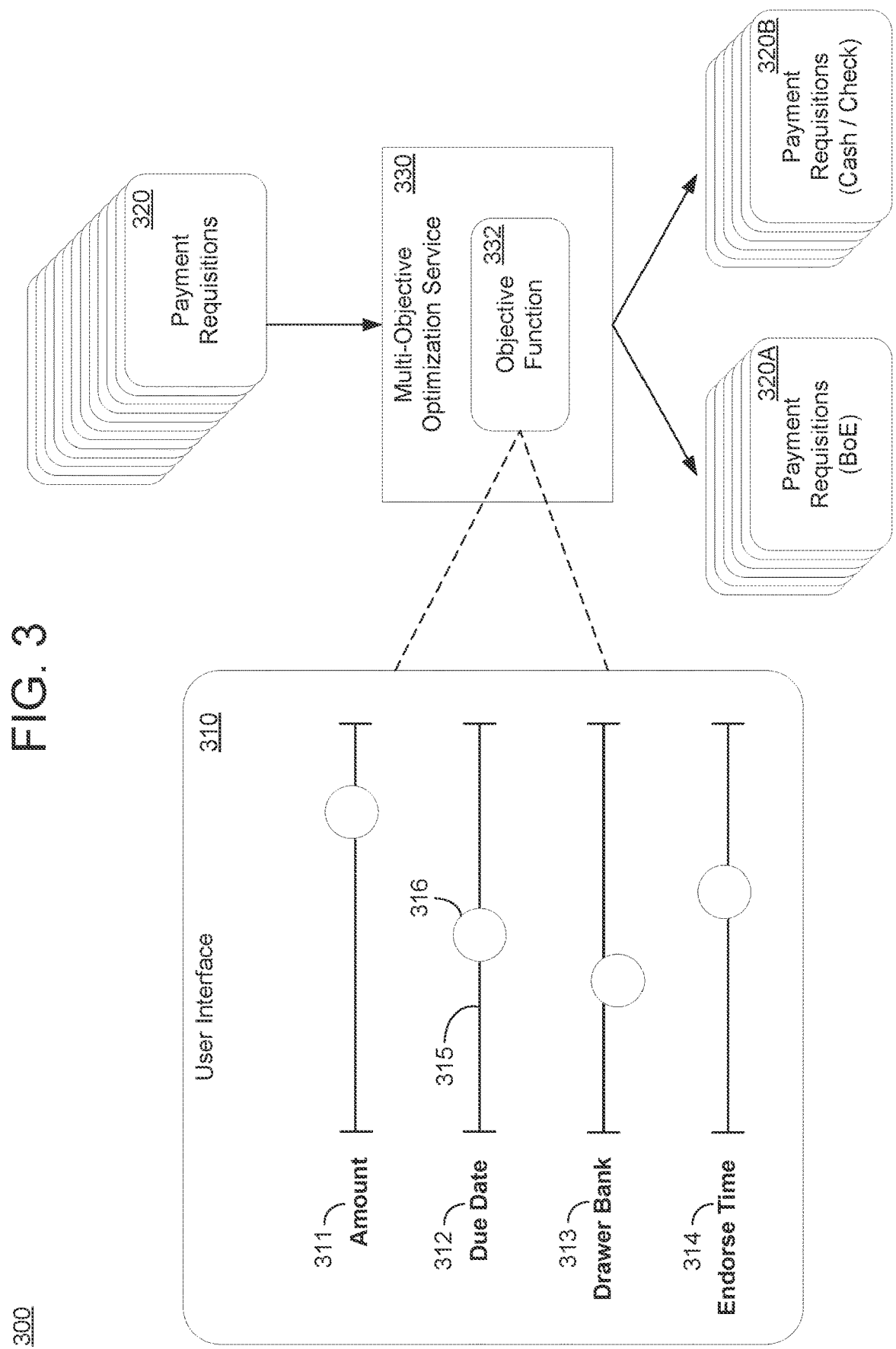
FIG. 3 is a diagram illustrating a process of dynamically configuring parameter values of an objective function for use in identifying invoices that are optimal for payment via bill of exchange in accordance with an example embodiment.

FIG. 3 illustrates a process 300 of dynamically configuring parameter values of an objective function for use in identifying invoices that are optimal for payment via bill of exchange in accordance with an example embodiment. Referring to FIG. 3, a host platform may host a multi-objective optimization service 330 that is developed to identify an optimal subset of payment requisitions 320A that should be paid using BoE from among a larger set/batch of payment requisitions 320. Here, the multi-objective optimization service 330 may also identify one or more additional subsets of payment requisitions (e.g., subset 320B, etc.) that are to be paid by different payment methods such as cash or check. As the name suggest, the multi-objective optimization service 330 may have an objective function 332 that considers multiple objectives including minimizing costs using BoE, paying BoEs with higher priority first, avoiding the creation of new BoEs (e.g., when receivable BoEs are note enough to pay for a payment requisition, etc.), and the like.

Organizations have several different options to choose from when deciding how to pay invoices, payment requisitions, etc. For example, payment methods include cash, check, and BoE. BoE is different from a check because a BoE is a promise issued by a company and guaranteed by a bank which can be cashed at a particular date in the future whereas a check can be cashed immediately (on-demand) of the payee. When an organization wants to pay vendors, they consider many factors on how to pay. Cash is often most important to the organization. In this case, it may be beneficial to pay with less cash and use other payment methods instead such as BoE. Typically, a treasury specialist (i.e., a person) is required to determine a payment method for a particular invoice and select appropriate payment notes for payment.

Different from other payment methods, BoE has many possible combinations when there are thousands of receivable BoEs. Because of this, it may take a treasury specialist a significant amount of time and effort to match the receivable BoEs manually. There are many impact factors should be considered when matching receivable BoEs. With increasing scale of receivable BoEs, it is more difficult to select a beneficial combination that is best for the customer by considering every dimension manually. It becomes a pain point to the customer in their regular work.

The example embodiments provide an automated tool (i.e., the multi-objective optimization service 330) that can automatically identify payment requisitions that should be paid by BoE and payment requisitions that should be paid with other payment methods such as cash or check. The objective function 332 identifies an optimal subset of payment requisitions for payment via BoE based on various attributes 311-314 that can be dynamically configured by a user via a user interface 310. Thus, a user can decide how much weight should be applied to each of the attributes 311-314 by the objective function 332 when automatically identifying the optimal subset of payment requisitions 320A. For example, a user may move a slider knob 316 along an axis 315 to set the value of the attribute. The values of the attributes may then be dynamically imported into the objective function 332 (i.e., the objective function template). Thus, a treasury specialist (person) can be relieved of having to manually determine a payment method for the set of payment requisitions 320 and instead rely on the multi-objective optimization service 330 to automatically determine a payment method.

Other possible solutions for automated matching of payment requisitions to payment methods include a rules engine (statically defined rules) and a machine learning algorithm. However, compared with the rule engine, the multi-objective optimization service 330 is significantly less complex. Furthermore, compared with machine learning, the multi-objective optimization service 330 does not require training or training data. Thus, the multi-objective optimization service 330 is the best way to solve this complicated business problem at a lower cost. The example embodiments provide a solution that includes priority management of BoE and the multi-objective optimization service 330. Priority management can be implemented via the user interface 310. Each organization may have different interests. Therefore, which payment requisitions are optimal for payment by BoE may differ from one organization to the next. The dynamically configurable priority attributes 311-314 enable an organization to customize the objective function 332 to their particular interests.

Priority management is an enhancement of BoE management. In this example, there are multiple attribute fields of BoE that play a role in matching which payment requisitions should be paid by BoE including an amount 311, a due date 312, an endorse time 313 (i.e., the number of times a BoE must be signed, etc.), and a drawer bank 314. Here, the objective function 332 is dynamically configurable (e.g., a template) based on the priority values that are set for these four attributes 311-314 via the user interface 310.

For the multi-objective optimization service 330, the business problem may be converted into a constrained optimization problem. Firstly, the attributes 311-314 that impact the objective function 332 are collected from the user interface 310 by the multi-objective optimization service 330 and input into the objective function 332. The attributes are classified into a plurality of different business data models such as payment requisition, bank account, payment notes, payment method, and agreement. Based on business data models, three fundamental elements are defined in the multi-objective optimization service 330. The three fundamental elements are variable, objective function, and constraint.

The result output by the multi-objective optimization service 330 may be a list of receivable BoEs waiting for endorsement. In this case, a multi-dimensional vector may be defined as the variable. In this example, every element within the vector stands for a payment requisition selection status. As an example, a list of payment requisitions may contain 10 invoices from 0001 to 0010 for two payment requisitions PR01 and PR02. Here, the input vector may be defined as X=[1, 0, 1, 0, 0, 0, 2, 0, 0, 0], where the variable (1) means that invoices 0001 and 0003 are selected for payment by BoE for the first payment requisition PR01, and invoice 0007 is selected for payment by BoE for the second payment requisition PR02. Meanwhile, when a vector element has a value of 0, it means the BoE is not selected. Here, the element 0 may mean that cash or check is selected.

The objective function 332 describes the business target that the organization/customer can benefit from. The objective function 332 may find a BoE with higher priority first. An example of an objective function F(x) is shown below in Equation 1.

$$F(x) = \max\left(\sum_{i=1}^{n} x_i * r_i\right), x \neq 0 \quad \text{Equation 1}$$

In Equation 1, x is a multi-dimensional vector where every element stands for an invoice selection status and r is a multi-dimensional vector where every element stands for the priority of the invoice. Here, the variable (i) stands for the specific invoice in the input vector. The objective function 332 may be executed on the plurality of invoices (and their attribute values) to identify the most optimal invoices for payment via BoE.

Furthermore, constraints may be derived from business object models as border condition and they are restrictions in the calculation. For example, constraints may be used to limit the total amount of invoices paid by BoE, or any other desired restriction. Equation 2 below illustrates an example of an objective function G(x) in which a supplier wants to limit the amount paid by BoE to be less than 50% of the total amount of invoices considered.

$$G(x) = \sum_{i=1}^{n} x_i * m_i, G(x) \leq C \quad \text{Equation 2}$$

In Equation 2, x is again a multi-dimensional vector where every element stands for an invoice selection status and a vector m is a multi-dimensional vector where every element stands for the priority of the invoice. In addition, C represents the total amount that can be paid by BoE. The objective function G(x) may be executed on the plurality of invoices (and their attribute values) to identify the most optimal invoices for payment via BoE.

The example provided in FIG. 3 provides an organization with a predefined objective function template that can be dynamically filled-in/configured by the organization. Meanwhile, the functionality is also provided to add customizing objective functions and set priority of objective functions. In addition, the constraints may focus on the amount paid by BoE and they are determined in terms of agreement data model. In some embodiments, an organization can use several objective functions at the same time when there are several business targets. In this example, the objective functions may have priority/weightings that are based on the core interests of the organization. At the end of the execution of the objective function 332, the multi-objective optimization service 330 may output an optimal solution including appropriate BoE list that identifies which invoices (e.g., invoice IDs, etc.) should be paid by BoE and which invoices should be paid by other payment methods. Considering flexibility and applicability, the viewer/organization may ultimately decide the optimal solution by themselves. However, the multi-objective optimization service 330 provides the viewer with a set of pareto-optimal solutions (those that are not dominated by any other feasible solutions). The results may be displayed on a user interface and/or stored within a data file such as a CSV file or an XML file for further analysis.

Referring again to FIG. 2B, there is shown an example in which an organization desires to pay more BoEs with high priority value. In this example, there are two payment requisitions as listed below:

| Requisition Number | Amount |
|---|---|
| 1 | 100 |
| 2 | 100 |

Here, the organization has the following BoEs with priority values:

| BoE Number | Amount | Priority |
|---|---|---|
| 01 | 100 | 20 |
| 02 | 100 | 50 |
| 03 | 100 | 80 |
| 04 | 100 | 90 |

The objective function template 230 may be filled in based on the data from the payment requisitions, the BoEs, and the priority values. To explain the formula, the example above results in the following variables:

$X_i$: (0, 0, 1, 2)
$r_i$: (20, 50, 80, 90)

In this case, $X_i$ is a multi-dimensional vector that includes all of the BoEs and which payment requisition is to be paid by the BoE. In addition, $r_i$ is a set of priority values for the set of BoEs. Meanwhile, $X_i/X_i$ refers to which BoE is selected to pay. In this case, $X_i/X_i$ is equal to (0, 0, 1, 1). The solution to the optimization problem can be generated by inputting the vector xi into the input fields 231 and inputting the vector $r_i$ into the input field 232 of the objective function template 230. The filled-in objective function template 230 may be executed to calculate the aggregation of priority values of all the paid BoEs. In this case, the result of formular is {0, 0, 1, 1}×{20, 50, 80, 90}=80+90=170. This represents the max priority value and fulfills the business target.

Figure 4:
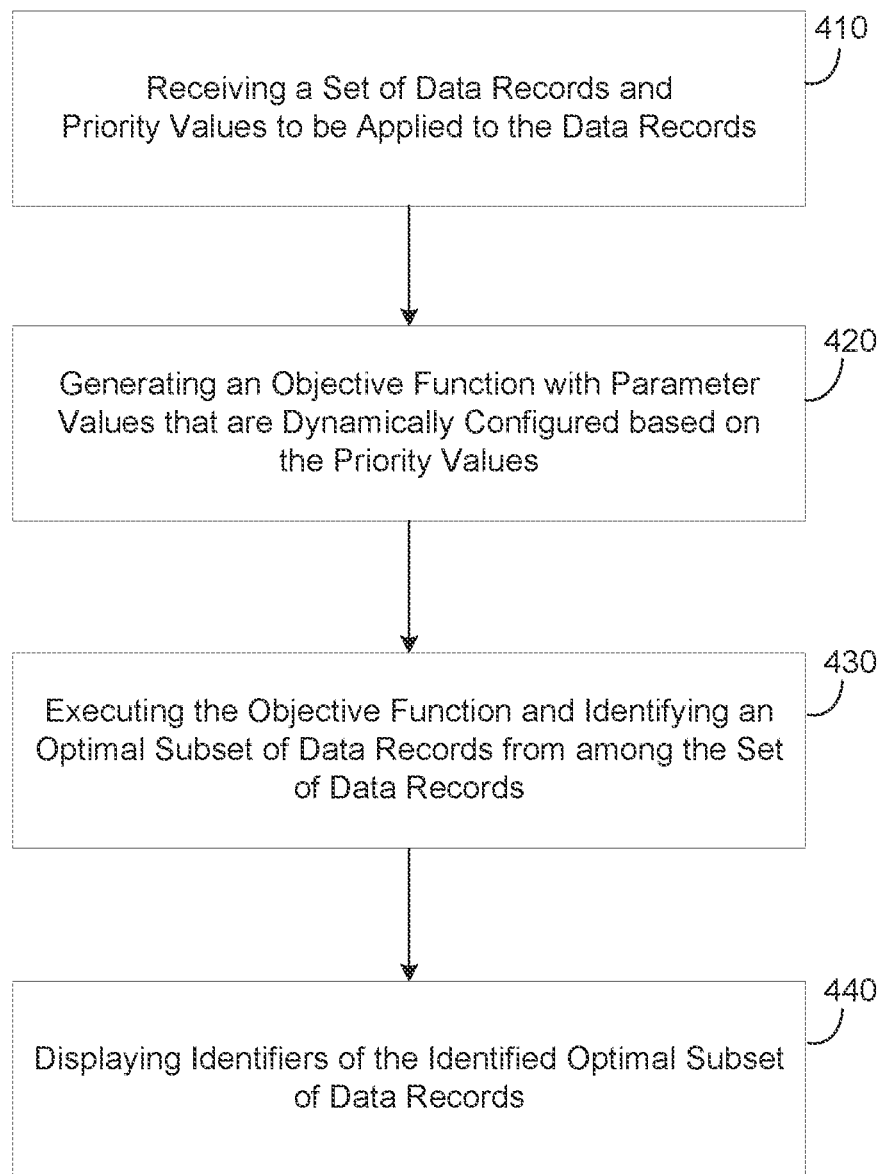
FIG. 4 is a diagram illustrating a method of selecting an optimal subset of data records based on a dynamically configured objective function in accordance with an example embodiment.

FIG. 4 illustrates a method 400 of selecting an optimal subset of data records based on a dynamically configured objective function in accordance with an example embodiment. For example, the method 400 may be performed by a software program running on a database node, a cloud platform, a server, a computing system (user device), a combination of devices/nodes, or the like. Referring to FIG. 4, in 410, the method may include receiving a set of data records and priority values to be applied to the set of data records. For example, the set of data records may be a set of database records, documents, invoices, files, or the like, which have different values stored therein.

In 420, the method may include generating an objective function from an objective function template stored in a memory device, wherein the generating comprises dynamically configuring parameter values of the objective function based on the priority values. Here, the service may input dynamically configured weights into the objective function to control the amount of weight/priority given to the variables of the objective function. In 430, the method may further include executing the objective function on the set of data records and identifying an optimal subset of data records from among the set of data records based on the dynamically configured parameter values of the executing objective function. Furthermore, in 440, the method may include displaying identifiers of the identified optimal subset of data records. For example, the service may display a list of the data records (e.g., document IDs, invoice IDs, names, etc.) of the optimal data records and/or of the non-optimal data records.

In some embodiments, the generating may include generating a multiple-objective optimization function that includes a plurality of parameter values that are dynamically configured according to a plurality of priority values, respectively. Here, the parameter values may correspond to weights or coefficients that are applied to variables within the objective function algorithm. In some embodiments, the method may further include converting the set of data records into a first vector which includes a plurality of values representing a plurality of data records, respectively, and converting a plurality of priority values into a second vector which includes a plurality of values representing the plurality of priority values, respectively. In this example, the generating may include inputting the first vector representing the plurality of data records and the second vector representing the plurality of priority values into the objective function template.

In some embodiments, the method may further include receiving one or more constraints for identifying the optimal subset and filtering the set of data records based on the one or more constraints prior to executing the objective function. In some embodiments, the method may further include displaying a user interface that includes a plurality of sliders that represent a plurality of priority values, respectively. In some embodiments, the method may further include detecting a change in a priority value based on movement of a corresponding slider via the user interface, and modifying one or more parameter values of the objective function based on the detected change in the priority value.

Figure 5:
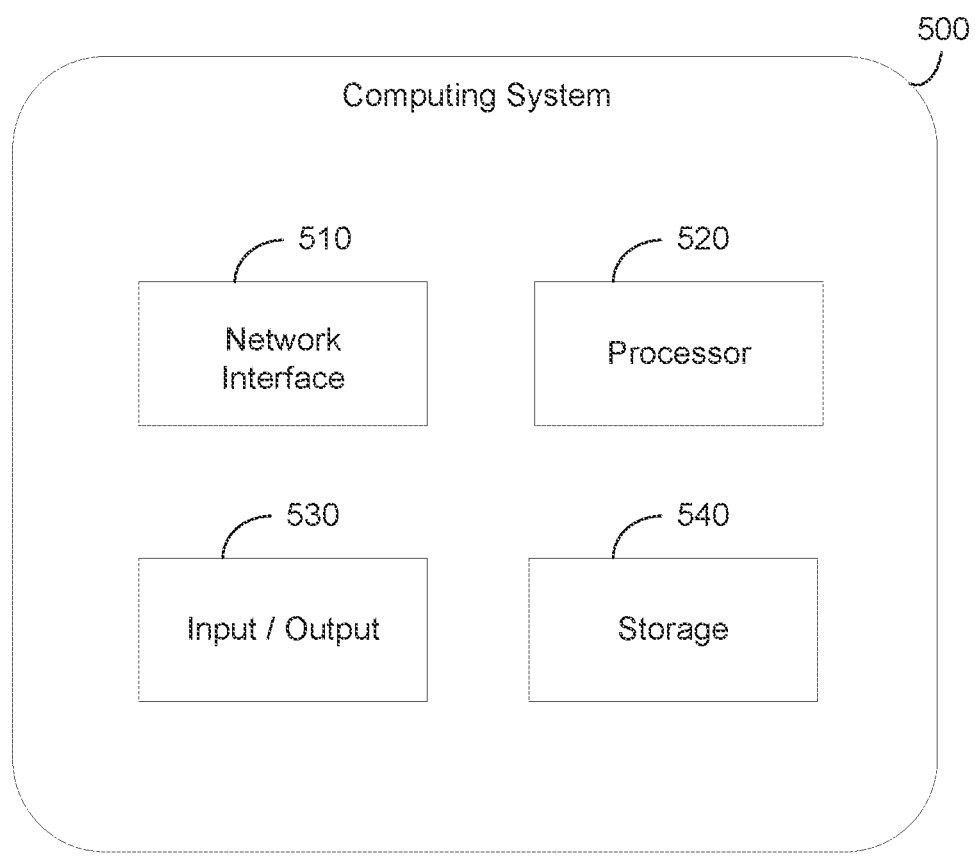
FIG. 5 is a diagram illustrating a computing system for use in the examples herein in accordance with an example embodiment.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes. Referring to FIG. 5, the computing system 500 includes a network interface 510, a processor 520, an input/output 530, and a storage 540 such as an in-memory storage, and the like. Although not shown in FIG. 5, the computing system 500 may also include or be electronically connected to other components such as a microphone, a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage 540 is not limited to a particular storage device and may include any known memory device such as RAM, ROM, hard disk, and the like, and may or may not be included within a database system, a cloud environment, a web server, or the like. The storage 540 may store software modules or other non-transitory instructions which can be executed by the processor 520 to perform the methods and processes described herein. The storage 540 may include a data store having a plurality of tables, partitions, and sub-partitions. The storage 540 may be used to store database records, items, entries, and the like. Also, the storage 540 may be queried using SQL commands.

According to various embodiments, the storage 540 may be configured to store a sequential order for a plurality of identifiers. For example, the sequential order may be stored within an internal memory or data store of an application. The processor 520 may display a currently selected identifier from among the plurality of identifiers at a predetermined position on a user interface and hide remaining identifiers from among the plurality of identifiers from being displayed on the user interface. The processor 520 may detect a click on a predefined graphical element of the user interface. In response to detection of the click, the processor 520 may delete the currently selected identifier from the user interface and replace it with a hidden identifier from among the remaining identifiers not displayed on the user interface based on the sequential order. In some embodiments, the processor 520 may automatically select the hidden identifier from among the plurality of hidden identifiers not displayed on the user interface based on a position of the hidden identifier within the sequential order.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a memory configured to store an objective function template and a set of data records, wherein each data record comprises a plurality of respective values for a plurality of attributes of a payment stored therein; and
a processor configured to
receive a plurality of priority values for the plurality of attributes of the payment via a user interface, wherein a priority value from among the plurality of priority value sets a priority of a payment due date attribute of the payment,
dynamically configure the objective function template based on the plurality of priority values of the plurality of attributes including the priority of the payment due date to generate a dynamically configured objective function, wherein the processor dynamically configures weight values of the objective function template based on the plurality of priority values among the plurality of attributes,
determine optimal payment types for each data record among the set of data records via execution of the dynamically configured objective function on attribute values stored in the set of data records,
identify a first subset of data records that are optimal for a first payment type and identify a second subset of data records that are optimal for a second payment type based on the determined optimal payment types; and
display identifiers of the first subset of data records that are optimal for the first payment type via the user interface.

2. The computing system of claim 1, wherein the processor is configured to generate a multiple-objective optimization function that includes a plurality of parameters with weights that are dynamically configured based on the plurality of priority values of the plurality of attributes, respectively.

3. The computing system of claim 1, wherein the processor is further configured to convert the set of data records into a first vector which includes a plurality of values representing a plurality of data records, respectively, and convert a plurality of priority values of the plurality of attributes into a second vector, respectively.

4. The computing system of claim 3, wherein the processor is configured to input the first vector representing the plurality of data records and the second vector representing the plurality of priority values into the objective function template when dynamically configuring the objective function, and execute the dynamically configured objective function based on the input first and second vectors.

5. The computing system of claim 1, wherein the processor is further configured to receive one or more constraints for identifying the first subset of data records that is optimal for the first payment type and filter the set of data records based on the one or more constraints to remove one or more data records that are not optimal for the first payment type prior to executing the dynamically configured objective function.

6. The computing system of claim 1, wherein the processor is further configured to display a plurality of sliders that represent Hall the plurality of priority values of the plurality of attributes, respectively, via the user interface.

7. The computing system of claim 6, wherein the processor is further configured to detect a change in a priority value of an attribute based on movement of a corresponding slider via the user interface, and update a weight of one or more parameters within the objective function based on the detected change in the priority value of the attribute.

8. A method comprising:
receiving a set of data records, wherein each data record comprises a plurality of respective values for a plurality of attributes of a payment stored therein;
receiving a plurality of priority values for the plurality of attributes of the payment via a user interface, wherein a priority value from among the plurality of priority value sets a priority of a payment due date attribute of the payment;
dynamically configuring an objective function template stored in a memory device based on the plurality of priority values of the plurality of attributes including the priority of the payment due date to generate a dynamically configured objective function, wherein the dynamically configuring comprises dynamically configuring weight values of the objective function template based on the plurality of priority values of the plurality of attributes;
determining optimal payment types for each data record among the set of data records via execution of the dynamically configured objective function on attribute values stored in the set of data records;
identifying a first subset of data records that are optimal for a first payment type and identify a second subset of data records that are optimal for a second payment type based on the determined optimal payment types; and
displaying identifiers of the first subset of data records that are optimal for the first payment type via the user interface.

9. The method of claim 8, wherein the generating comprises generating a multiple-objective optimization function that includes a plurality of parameters with weights that are dynamically configured based on the plurality of priority values of the plurality of attributes, respectively.

10. The method of claim 8, wherein the method further comprises converting the set of data records into a first vector which includes a plurality of values representing a plurality of data records, respectively, and converting the plurality of priority values of the plurality of attributes into a second vector, respectively.

11. The method of claim 10, wherein the generating comprises inputting the first vector representing the plurality of data records and the second vector representing the plurality of priority values into the objective function template when dynamically configuring the objective function, and executing the dynamically configured objective function based on the input first and second vectors.

12. The method of claim 8, wherein the method further comprises receiving one or more constraints for identifying the first subset of data records that is optimal for the first payment type and filtering the set of data records to remove one or more data records from the set that are not optimal for the first payment type based on the one or more constraints, prior to executing the dynamically configured objective function.

13. The method of claim 8, wherein the method further comprises displaying a plurality of sliders that represent Hail the plurality of priority values of the plurality of attributes, respectively, via the user interface.

14. The method of claim 13, wherein the method further comprises detecting a change in a priority value of an attribute based on movement of a corresponding slider via the user interface, and updating a weight of one or more parameters within the objective function template based on the detected change in the priority value of the attribute.

15. A non-transitory computer-readable medium comprising instructions which when read by a processor cause a computer to perform a method comprising:
   receiving a set of data records, wherein each data record comprises a plurality of respective values for a plurality of attributes of a payment stored therein;
   receiving a plurality of priority values for the plurality of attributes of the payment via a user interface, wherein a priority value from among the plurality of priority value sets a priority of a payment due date attribute of the payment;
   dynamically configuring an objective function template stored in a memory device based on the plurality of priority values for the plurality of attributes including the priority of the payment due date to generate a dynamically configured objective function, wherein the dynamically configuring comprises dynamically configuring parameter values of the objective function template based on the priority values;
   determining optimal payment types for each data record among the set of data records via execution of the dynamically configured objective function on attributes stored in the set of data records;
   identifying a first subset of data records that are optimal for a first payment type and identify a second subset of data records that are optimal for a second payment type based on the determined optimal payment types; and
   displaying identifiers of the first subset of data records that are optimal for the first payment type via the user interface.

16. The non-transitory computer-readable medium of claim 15, wherein the generating comprises generating a multiple-objective optimization function that includes a plurality of parameters with weights that are dynamically configured based on the plurality of priority values of the plurality of attributes, respectively.

17. The non-transitory computer-readable medium of claim 15, wherein the method further comprises converting the set of data records into a first vector which includes a plurality of values representing a plurality of data records, respectively, and converting the plurality of priority values of the plurality of attributes into a second vector, respectively.

18. The non-transitory computer-readable medium of claim 17, wherein the generating comprises inputting the first vector representing the plurality of data records and the second vector representing the plurality of priority values into the objective function template when dynamically configuring the objective function, and executing the dynamically configured objective function based on the input first and second vectors.

19. The non-transitory computer-readable medium of claim 15, wherein the method further comprises receiving one or more constraints for identifying the first subset of data records that is optimal for the first payment type and filtering the set of data records to remove one or more data records from the set that are not optimal for the first payment type based on the one or more constraints prior to executing the dynamically configured objective function.

20. The non-transitory computer-readable medium of claim 15, wherein the method further comprises displaying a user interface that includes a plurality of sliders that represent the plurality of priority values of the plurality of attributes, respectively, detecting a change in a priority value of an attribute based on movement of a corresponding slider via the user interface, and updating a weight of one or more parameters within the objective function template based on the detected change in the priority value of the attribute.

21. The computing system of claim 1, wherein the processor is further configured to display identifiers of the first subset of data records that are optimal for the first payment type via the user interface.

* * * * *